United States Patent
Chen et al.

(10) Patent No.: US 11,074,504 B2
(45) Date of Patent: Jul. 27, 2021

(54) INSTANCE SEGMENTATION

(71) Applicant: Google LLC, Mountain View, CA (US)

(72) Inventors: Liang-Chieh Chen, Los Angeles, CA (US); Alexander Hermans, Aachen (DE); Georgios Papandreou, Los Angeles, CA (US); Gerhard Florian Schroff, Santa Monica, CA (US); Peng Wang, Los Angeles, CA (US); Hartwig Adam, Marina del Rey, CA (US)

(73) Assignee: Google LLC, Mountain View, CA (US)

( * ) Notice: Subject to any disclaimer, the term of this patent is extended or adjusted under 35 U.S.C. 154(b) by 104 days.

(21) Appl. No.: 16/611,604

(22) PCT Filed: Nov. 14, 2018

(86) PCT No.: PCT/US2018/060880
§ 371 (c)(1),
(2) Date: Nov. 7, 2019

(87) PCT Pub. No.: WO2019/099428
PCT Pub. Date: May 23, 2019

(65) Prior Publication Data
US 2020/0175375 A1 Jun. 4, 2020

Related U.S. Application Data (60) Provisional application No. 62/586,493, filed on Nov. 15, 2017.

(51) Int. Cl.
G06N 3/08 (2006.01)
G06N 20/00 (2019.01)
(Continued)

(52) U.S. Cl.
CPC .............. G06N 3/084 (2013.01); G06N 20/00 (2019.01); G06T 7/11 (2017.01); G06T 7/174 (2017.01);
(Continued)

(58) Field of Classification Search
CPC ...... G06N 20/00; G06N 3/0454; G06N 3/084; G06T 2207/20021; G06T 2207/20081;
(Continued)

(56) References Cited

U.S. PATENT DOCUMENTS 10,108,620 B2   10/2018   Zhao et al.
10,394,878 B2 *  8/2019   Zhao .................. G06K 9/00751
(Continued)

OTHER PUBLICATIONS

Abadi et al. "Tensorflow: Large-scale machine learning on heterogeneous distributed systems," arXiv 1603.04467, Mar. 16, 2016, 19 pages.
(Continued)

Primary Examiner — Bobbak Safaipour
(74) Attorney, Agent, or Firm — Fish & Richardson P.C.

(57) ABSTRACT

Methods, systems, and apparatus, including computer programs encoded on a computer storage medium, for instance segmentation. In one aspect, a system generates: (i) data identifying one or more regions of the image, wherein an object is depicted in each region, (ii) for each region, a predicted type of object that is depicted in the region, and (iii) feature channels comprising a plurality of semantic channels and one or more direction channels. The system generates a region descriptor for each of the one or more regions, and provides the region descriptor for each of the one or more regions to a segmentation neural network that processes a region descriptor for a region to generate a predicted segmentation of the predicted type of object depicted in the region.

20 Claims, 4 Drawing Sheets (51) Int. Cl.
  *G06T 7/174*  (2017.01)
  *G06T 7/11*   (2017.01)
  *G06T 7/187*  (2017.01)
(52) U.S. Cl.
  CPC .... *G06T 7/187* (2017.01); *G06T 2207/20021* (2013.01); *G06T 2207/20081* (2013.01); *G06T 2207/20084* (2013.01)
(58) Field of Classification Search
  CPC . G06T 2207/20084; G06T 7/11; G06T 7/174; G06T 7/187
  See application file for complete search history.

(56) References Cited

U.S. PATENT DOCUMENTS

| | | | | |
|---|---|---|---|---|
| 10,467,754 | B1* | 11/2019 | Ando | G06K 9/6215 |
| 10,678,846 | B2* | 6/2020 | Gordo Soldevila | |
| | | | | G06K 9/3233 |
| 10,769,501 | B1* | 9/2020 | Ando | G01N 33/5005 |
| 10,860,919 | B2* | 12/2020 | Kanazawa | G06N 20/20 |
| 10,922,350 | B2* | 2/2021 | Zhao | G06F 16/435 |
| 10,970,896 | B2* | 4/2021 | Kawano | G06T 1/0007 |
| 2019/0385026 | A1* | 12/2019 | Richeimer | G06K 9/00718 |
| 2021/0027085 | A1* | 1/2021 | Wu | G06F 16/5854 |
| 2021/0027471 | A1* | 1/2021 | Cohen | G06K 9/4642 |
| 2021/0073986 | A1* | 3/2021 | Kapur | G06K 9/00147 |

OTHER PUBLICATIONS

Adams et al. "Fast high-dimensional filtering using the permutohedral lattice," Computer Graphics Forum, vol. 29(2), May 2010, 10 pages.
Arbelaez et al. "Multiscale combinatorial grouping," CVPR, Jun. 2014, 8 pages.
Arnab et al. "Higher order conditional random fields in deep neural networks," arXiv 1511.08119, Jul. 29, 2019, 24 pages.
Arnab et al. "Pixelwise instance segmentation with a dynamically instantiated network," CVPR Jul. 2017, 10 pages.
Bai et al. "Deep watershed transform for instance segmentation," CVPR Jul. 2017, 9 pages.
Bell et al. "Inside-outside net: Detecting objects in context with skip pooling and recurrent neural networks," CVPR, Jun. 2016, 10 pages.
Brabandere et al. "Semantic instance segmentation with a discriminative loss function," arXiv 1708.02551, Aug. 8, 2017, 10 pages.
Carreira et al. "CPMC: Automatic object segmentation using constrained parametric min-cuts," PAMI 37(7), Dec. 6, 2012, 17 pages.
Chen et al. "Attention to scale: Scale-aware semantic image segmentation," CVPR, Jun. 2016, 10 pages.
Chen et al. "Deeplab: Semantic image segmentation with deep convolutional nets, atrous convolution, and fully connected Ccrfs," TPAMI, Apr. 26, 2017, 14 pages.
Chen et al. "Deeplab: Semantic image segmentation with deep convolutional nets, atrous convolution, and fully connected crfs," arXiv 1606.00915, May 12, 2017, 14 pages.
Chen et al. "MaskLab: Instance Segmentation by Refining Object Detection with Semantic and Direction Features," arXiv 1712.04837 Dec. 13, 2017, 10 pages.
Chen et al. "Multi-instance object segmentation with occlusion handling," CVPR, Jun. 2015, 9 pages.
Chen et al. "Rethinking atrous convolution for semantic image segmentation," arXiv 1706.05587, Jun. 17, 2017, 14 pages.
Chen et al. "Semantic image segmentation with deep convolutional nets and fully connected crfs,"arXiv 1412.7062, Dec. 22, 2014, 14 pages.
Chollet. "Xception: Deep learning with depthwise separable convolutions," arXiv 1610.02357, Oct. 7, 2016, 8 pages.
Dai et al. "Convolutional feature masking for joint object and stuff segmentation," CVPR, Jun. 2015, 9 pages.
Dai et al. "Deformable convolutional networks," ICCV, Jul. 2017, 10 pages.
Dai et al. "Instance-aware semantic segmentation via multi-task network cascades," CVPR, Jun. 26-Jul. 1, 2016, 9 pages.
Dai et al. "Instance-sensitive fully convolutional netowrks," ECCV Oct. 8, 2016, 15 pages.
Dai et al. "R-FCN: Object detection via region-based fully convolutional networks," NIPS Dec. 2016, 9 pages.
Eigen et al. "Predicting depth, surface normals and semantic labels with a common multi-scale convolutional architecture," ICCV Dec. 2015, 9 pages.
Erhan et al. "Scalable object detection using deep neural networks," CVPR, Jun. 2014, 8 pages.
Fathi et al. "Semantic instance segmentation via deep metric learning," arXiv1703.10277, Mar. 30, 2017, 9 pages.
Gallagher "Clothing cosegmentation for recognizing people," CVPR Jun. 23, 2008, 8 pages.
Gidaris et al. "Object detection via a multi-region and semantic segmentation-aware cnn model," ICCV, Dec. 2015, 9 pages.
Girshick et al. "Rich feature hierarchies for accurate object detection and semantic segmentation," CVPR, Jun. 2014, 8 pages.
Girshick. "Fast r-cnn" ICCV, Jun. 2015, 9 pages.
Giusti et al. "Fast image scanning with deep max-pooling convolutional neural networks," ICIP, Sep. 15-18, 2013, 5 pages.
Hariharan et al. "Hyper-columns for object segmentation and fine-grained localization," CVPR, Jun. 2015, 10 pages.
Hariharan et al. "Simultaneous detection and segmentation," ICCV, Sep. 6, 2014, 16 pages.
Hayder et al. "Boundary-aware instance segmentation," CVPR, Jul. 21-26, 2017, 9 pages.
He et al. "Deep residual learning for image recognition," CVPR Jun. 26-Jul. 1, 2016, 9 pages.
He et al. "Mask R-CNN" ICCV, Oct. 22, 2017, 9 pages.
Hershey et al. "CNN Archtectures for large-scale audio classification," Proc. ICASSP, Mar. 2017, 5 pages.
Hinton et al. "Distilling the knowledge in a neural network,"arXiv 1503.02531, Mar. 9, 2015, 9 pages.
Huang et al. "Speed/accuracy trade-offs for modern convolutional object detectors," arXiv 1611.10012v3, Apr. 25, 2017, 21 pages.
Huang et al. "Speed/accuracy trade-offs for modern convolutional object detectors," CVPR, Jul. 2017, 10 pages.
Jin et al. "Object detection free instance segmentation with labeling transformations," arXiv 1611.08991, Nov. 29, 2016, 10 pages.
Khoreva et al. "Simple does it: Weakly supervised instance and semantic segmentation," CVPR, Jul. 2017, 10 pages.
Kirillov et al. "Instancecut: from edges to instances with multicut," CVPR, Jul. 2017, 10 pages.
Krahenbuhl et al. "Efficient inference in fully connected CRFs with gaussian edge potentials," NIPS Dec. 2011, 9 pages.
Krizhevsky et al. "ImageNet Classification with Deep Convolutional Neural Networks," NIPS, Dec. 2012, 9 pages.
LeCun et al. "Gradient based learning applied to document recognition," Proc. IEEE, Nov. 1998, 46 pages.
Levinkov et al. "Joint graph decomposition & node labeling: Problem, algorithms, application," CVPR, Jul. 2017, 9 pages.
Li et al. "Fully Convolutional Instance-Aware Semantic Segmentation," IEEE Computer Society Conference on CVPR, Jul. 21, 2017, 9 pages.
Li et al. "Iterative instance segmentation," CVPR, Jun. 2016, 9 pages.
Liang et al. "Proposal-free network for instance-level object segmentation," arXiv 1509.02636, Sep. 9, 2015, 14 pages.
Lin et al. "Efficient piecewise training of deep structured models for semantic segmentation," CVPR, Jun. 2016, 10 pages.
Lin et al. "Feature pyramid networks for object detection," CVPR, Jul. 2017, 9 pages.
Lin et al. "Microsoft COCO: Common objects in context," arXiv 1405.0312, May 1, 2014, 14 pages.
Liu et al. "Multi-scale patch aggregation (MPA) for simultaneous detection and segmentation," CVPR, Jun. 2016, 9 pages.
Liu et al. "Semantic image segmentation via deep parsing network," ICCV, Dec. 2015, 9 pages.

(56) References Cited

OTHER PUBLICATIONS

Liu et al. "SGN: Sequential grouping networks for instance segmentation," ICCV, Oct. 2017, 9 pages.
Liu et al. "SIFT Flow: Dense Correspondence across Scenes and its Applications," IEEE Transactions on Pattern Analysis and Machine Intellifence, vol. 33, No. 5, 2011, 17 pages.
Liu et al. "SSD: Single shot multibox detector," ECCV Oct. 8, 2016, 17 pages.
Long et al. "Fully convolutional networks for semantic segmentation," CVPR, Jun. 2015, 10 pages.
Luo et al. "Deep dual learning for semantic image segmentation," ICCV, Oct. 2017, 9 pages.
Newell et al. "Associative embedding: End-to-end learning for joint detection and grouping," NIPS, Dec. 2017, 11 pages.
Papandreou et al. "Modeling local and global deformations in deep learning: Epitomic convolution, multiple instance learning, and sliding window detection," CVPR, Jun. 2015, 10 pages.
Papandreou et al. "Weakly-and semi-supervised learning of a dcnn for semantic image segmentation," arXiv 1502.02734v3, Oct. 5, 2015, 12 pages.
PCT International Search Report and Written Opinion issued in International Application No. PCT/US2018/060880, dated Feb. 22, 2019, 17 pages.
PCT Written Opinion issued in International Application No. PCT/US2018/060880, dated Oct. 16, 2019, 8 pages.
Pinheiro et al. "Learning to refine object segments," arXiv 1603.08695v2 Jul. 26, 2016, 18 pages.
Pinheiro et al. "Learning to segment object candidates," NIPS, Dec. 2015, 9 pages.
Redmon et al. "You only look once: Unified, real-time object detection," CVPR, Jun. 2016, 10 pages.
Ren et al. "End-to-end instance segmentation with recurrent attention," CVPR, Jul. 2017, 9 pages.
Ren et al. "Faster R-CNN: Towards real-time object detection with region proposal networks," NIPS Dec. 2015, 9 pages.
Romera-Paredes et al. "Recurrent instance segmentation," arXiv 1511.08250v3, Oct. 24, 2016, 24 pages.
Sermanet et al. "Overfeat: Integrated recognition, localization and detection using convolutional networks," arXiv 1312.6229v4, Feb. 24, 2014, 16 pages.
Shrivastava et al. "Beyond skip connections: Top-down modulation for object detection," arXiv 1612.06851 Dec. 20, 2016, 11 pages.
Shrivastava et al. "Training region-based object detectors with online hard example mining," CVPR, Jun. 2016, 9 pages.
Sun et al. "Revisiting unreasonable effectiveness of data in deep learning era," ICCV, Jul. 2017, 10 pages.
Szegedy et al. "Inception-v4, inveption-resnet and the impact of residual connections on liearning," AAAI Feb. 12, 2017, 7 pages.
Szegedy et al. "Scalable, high-quality object detection," arXiv 1412.1441v3, Dec. 9, 2015, 10 pages.
Uhrig et al. "Pixel-level encoding and depth layering for instance-level semantic labeling," International Conference on Simulation, Modeling, and Programming for Autonomous Robots, Aug. 27, 2016, 12 pages.
Wang et al. "Understanding convolution for semantic segmentation," arXiv 1702.08502v1, Feb. 27, 2017, 10 pages.
Wu et al. "Bridging catefory-level and instance-level semantic image segmentation," arXiv 1605.06885, May 23, 2016, 14 pages.
Wu et al. "Wider or deeper: Revisiting the resnet model for visual recognition," arXiv 1611.10080, Nov. 30, 2016, 19 pages.
Xie et al. "Aggregated residual transformations for deep neural networks," CVPR, Jul. 2017, 9 pages.
Zagoruyko et al. "A multipath network for object detection," arXiv 1604.02135v2, Aug. 8, 2016, 14 pages.
Zhang et al. "Deep free-form deformation network for object-mask registration," CVPR Jul. 2017, 9 pages.
Zhang et al. "Instance-level segmentation for autonomous driving with deep densely connected mrfs," CVPR, Jun. 2016, 9 pages.
Zhang et al. "Monocular object instance segmentation and depth ordering with cnns," ICCV, Dec. 2015, 9 pages.
Zhao et al. "Pyramid scene parsing network," CVPR, July, 10 pages.
Zheng et al. "Conditional random fields as recurrent neural networks," ICCV, December, 9 pages.
Zhu et al. "SegDeepM: Exploiting segmentation and context in deep neural networks for object detection," CVPR, Jun. 2015, 9 pages.

\* cited by examiner

INSTANCE SEGMENTATION

CROSS-REFERENCE TO RELATED APPLICATION

This application is a National Stage Application under 35 U.S.C. § 371 and claims the benefit of International Application No. PCT/US2018/060880, filed Nov. 14, 2018, which claims priority to U.S. application Ser. No. 62/586,493, filed Nov. 15, 2017, the disclosure of which is incorporated herein by reference.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes an instance segmentation system implemented as computer programs on one or more computers in one or more locations that jointly performs object detection and semantic segmentation in images.

According to a first aspect there is provided a computer-implemented method comprising: providing an image as input to a descriptor neural network that processes the image to generate outputs including: (i) data identifying one or more regions of the image, wherein an object is depicted in each region, (ii) for each region, a predicted type of object that is depicted in the region, and (iii) feature channels comprising a plurality of semantic channels and one or more direction channels, wherein: each semantic channel is associated with a particular type of object and defines, for each pixel of the image, a respective likelihood that the pixel is included in an object of the particular type; and the direction channels characterize a predicted direction from each pixel of the image to a center of an object depicted in the image which includes the pixel; generating a region descriptor for each of the one or more regions, including, for each region: for at least one of the feature channels, extracting feature data corresponding to the region of the image from the feature channel; resizing the extracted feature data to a pre-determined dimensionality; and concatenating the resized feature data; and providing the region descriptor for each of the one or more regions to a segmentation neural network that processes a region descriptor for a region to generate an output comprising a predicted segmentation of the predicted type of object depicted in the region.

The method may further comprise: generating a segmentation descriptor for each of the one or more regions, including, for each region: extracting feature data corresponding to the region of the image from one or more intermediate outputs of the descriptor neural network; resizing the extracted feature data from the one or more intermediate outputs of the descriptor neural network to a pre-determined dimensionality; and concatenating the resized feature data from the one or more intermediate outputs of the descriptor neural network and the predicted segmentation of the predicted type of object depicted in the region; and providing the segmentation descriptor for each of the one or more regions to a refining neural network, wherein the refining neural network processes a segmentation descriptor to generate a refined predicted segmentation of the predicted type of object depicted in the region.

Generating a region descriptor for a region may comprise extracting feature data corresponding to the region of the image from the semantic feature channel associated with the predicted type of object depicted in the region. Generating a region descriptor for a region may further comprise pooling feature data corresponding to the region from one or more of the direction channels. Pooling feature data corresponding to the region from one or more of the direction channels may comprise: partitioning the region into one or more sub-regions; associating each of the sub-regions with a different direction channel; and for each of the sub-regions, extracting feature data corresponding to the sub-region from the direction channel associated with the sub-region.

The method may further comprise: determining that a pixel of the image is included in a predicted segmentation of a predicted type of object depicted in a region; and associating the pixel of the input image with the predicted type of object. The descriptor neural network and the segmentation neural network may be jointly trained. Jointly training the descriptor neural network and the segmentation neural network may comprise: backpropagating gradients of a loss function to jointly train the descriptor neural network and the segmentation neural network to generate more accurate predicted segmentations. The method may further comprise backpropagating gradients of the loss function to train the descriptor neural network to more accurately generate: (i) data identifying regions depicting objects, (ii) predicted types of objects depicted in the regions, and (iii) feature channels comprising semantic channels and direction channels. The method may further comprise backpropagating gradients of the loss function to jointly train the descriptor neural network, the segmentation neural network, and the refining neural network to generate more accurate predicted segmentations.

Generating a predicted type of object that is depicted in a region of the image may comprise: dividing the region into multiple sub-regions; generating, using an offset neural network, an offset for each sub-region; extracting feature data from an intermediate output of the descriptor neural network which corresponds to each of multiple offset sub-regions; resizing the extracted feature data from each of the multiple offset sub-regions; and processing the resized feature data using one or more neural network layers of the descriptor neural network to generate a predicted type of object that is depicted in the region of the image. The descriptor neural network may be pre-trained based on a set of training data.

According to a second aspect there is provided a computer-implemented method which includes providing an image as input to a descriptor neural network that processes the image to generate corresponding outputs. The outputs include data identifying one or more regions of the image, where an object is depicted in each region, and for each region, a predicted type of object that is depicted in the region. The outputs further include one or more feature channels, wherein each feature channel is an output of the descriptor neural network, and each feature channel has a same dimensionality as a dimensionality of the input image. A region descriptor is generated for each of the one or more regions, including, for each region: (i) for at least one of the feature channels, extracting feature data corresponding to the region of the feature channel, (ii) resizing the extracted feature data to a pre-determined dimensionality, and (iii) concatenating the resized feature data. The region descriptor for each of the one or more regions is provided to a segmentation neural network that processes a region descriptor for a region to generate an output including a predicted instance segmentation of the predicted type of object depicted in the region.

In some implementations, the method further includes generating a segmentation descriptor for each of the one or more regions. This may include, for each region, extracting feature data corresponding to the region from one or more intermediate outputs of the descriptor neural network that have the same dimensionality as the dimensionality of the input image. The extracted feature data from the one or more intermediate outputs of the descriptor neural network is re-sized to the pre-determined dimensionality. The resized features from the one or more intermediate outputs of the descriptor neural network and the predicted instance segmentation of the predicted type of object depicted in the region are concatenated. The segmentation descriptor for each of the one or more regions are provided to a refining neural network, where the refining neural network processes a segmentation descriptor to generate a refined predicted instance segmentation of the predicted type of object depicted in the region corresponding to the segmentation descriptor.

In some implementations, the feature channels include one or more semantic feature channels, where each semantic feature channel is associated with a particular type of object.

In some implementations, generating a region descriptor for a region further includes extracting feature data corresponding to the region of a semantic feature channel associated with the predicted type of object depicted in the region.

In some implementations, generating a region descriptor for a region further includes pooling feature data corresponding to the region of one or more feature channels.

In some implementations, pooling feature data corresponding to the region of one or more feature channels includes partitioning the region into one or more sub-regions. Each of the sub-regions is associated with a different feature channel. For each of the sub-regions, feature data corresponding to the sub-region of the feature channel associated with the sub-region is extracted.

In some implementations, the method further includes determining that a pixel of the input image is in a predicted instance segmentation of a predicted type of object depicted in a region. The pixel of the input image is associated with the predicted type of object.

In some implementations, the method further includes backpropagating gradients based on a loss function to jointly train the descriptor neural network and the segmentation neural network to generate more accurate predicted instance segmentations.

In some implementations, backpropagating gradients based on the loss function further includes training the descriptor neural network to generate data identifying regions depicting objects and predicted types of objects depicted in the regions more accurately.

In some implementations, the method further includes backpropagating gradients based on a loss function to jointly train the descriptor neural network, the segmentation neural network, and the refining neural network to generate more accurate predicted instance segmentations.

In some implementations, extracting feature data corresponding to a region of a feature channel further includes dividing the region into multiple sub-regions. An offset neural network is used to generate an offset for each sub-region. Feature data corresponding to each of multiple offset sub-regions of the feature channel is extracted. The extracted feature data from each of the multiple offset sub-regions is resized.

In some implementations, the descriptor neural network is pre-trained based on a set of training data.

It will be appreciated that aspects can be implemented in any convenient form. For example, aspects may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs arranged to implement the invention. Aspects can be combined such that features described in the context of one aspect may be implemented in another aspect.

Particular embodiments of the subject matter described in this specification can be implemented so as to realize one or more of the following advantages.

The instance segmentation system described in this specification can process an image to generate object detection data which defines: (i) regions in the image (e.g., specified by bounding boxes) that each depict an object instance, and (ii) a respective object type of the object instance depicted in each region. Thereafter, the system can generate a respective segmentation of the object instance depicted in each of the regions.

In general, a region of an image which the system determines to depict an object instance of a particular object type may also depict: (i) parts of one or more additional object instances of the same object type, (ii) parts or all of one or more additional object instances of different object types, or (iii) both. For example, a bounding box around a given person in an image may additionally contain the arm and shoulder of another person standing next to the given person in the image, a coffee cup (or other object) being held in the hand of the given person, or both.

The system described in this specification can generate a segmentation of an object instance depicted in a region which excludes: (i) any parts of additional object instances of the same type, and (ii) any additional object instances of different types, which are also depicted in the region. In particular, the system can process the image to generate semantic channels and direction channels. For each pixel of the image, the semantic channels characterize a respective likelihood that the pixel is included in an object of each of a predetermined number of possible object types, and the direction channels characterize a direction from the pixel to the center of an object which includes the pixel. The system can distinguish the object instance depicted in the region from any parts of additional object instances of the same type which are also depicted in the region using the direction channels. Moreover, the system can distinguish the object instance depicted in the region from any additional object instances of different types which are also depicted in the region using the semantic channels. Therefore, by generating object instance segmentations using semantic channels and direction channels, the system described in this specification can generate object instance segmentations which may be more accurate than object instance segmentations generated by conventional systems. This is a technical improvement in the field of image processing.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes an instance segmentation system implemented as computer programs on one or more computers in one or more locations. The system described in this specification is configured to jointly perform object detection and semantic segmentation by processing an image to generate an output which defines: (i) regions in the image that each depict an instance of a respective object, (ii) a respective object type of the object instance (e.g., vehicle, cat, person, and the like) depicted in each region, and (iii) a respective segmentation of the object instance depicted in each region. A segmentation of an object instance depicted in a region defines which pixels in the region are included in the object instance. In this specification, a region of an image refers to a contiguous subset of the image, for example, as defined by a bounding box in the image.

The system processes an image using a descriptor neural network to generate object detection data and feature channels corresponding to the image. The object detection data defines: (i) regions of the image that each depict an object instance, and (ii) a respective object type of the object instance depicted in each region. The feature channels include: (i) semantic channels, (ii) direction channels, or (iii) both. For each pixel of the image, the semantic channels characterize a respective likelihood that the pixel is included in an object of each of a predetermined number of possible object types, and the direction channels characterize a direction from the pixel to the center of an object which includes the pixel.

The system processes the object detection data and the feature channels to generate a respective region descriptor for each of the regions defined by the object detection data. For example, the system can generate the region descriptor for a region by extracting (e.g., cropping) feature data corresponding to the region from one or more of the feature channels (i.e., the semantic channels, the direction channels, or both). The system processes each region descriptor using a segmentation neural network to generate a segmentation of the object instance depicted in the region.

In general, a region of the image which the system determines to depict an object instance of a particular object type may also depict: (i) parts of one or more additional object instances of the same object type, (ii) parts or all of one or more additional object instances of different object types, or (iii) both. For example, a bounding box around a given person in an image may additionally contain the arm and shoulder of another person standing next to the given person in the image, a coffee cup (or other object) being held in the hand of the given person, or both. The segmentation neural network can process a region descriptor to generate a segmentation of the object instance depicted in the region which excludes: (i) any parts of additional object instances of the same type, and (ii) any additional object instances of different types, which are also depicted in the region. To distinguish the object instance depicted in the region from any parts of additional object instances of the same type which are also depicted in the region, the segmentation neural network can use the components of the region descriptor extracted from the direction channels. To distinguish the object instance depicted in the region from any additional object instances of different types which are also depicted in the region, the segmentation neural network can use the components of the region descriptor extracted from the semantic channels.

These features and other features are described in more detail below.

Figure 1:
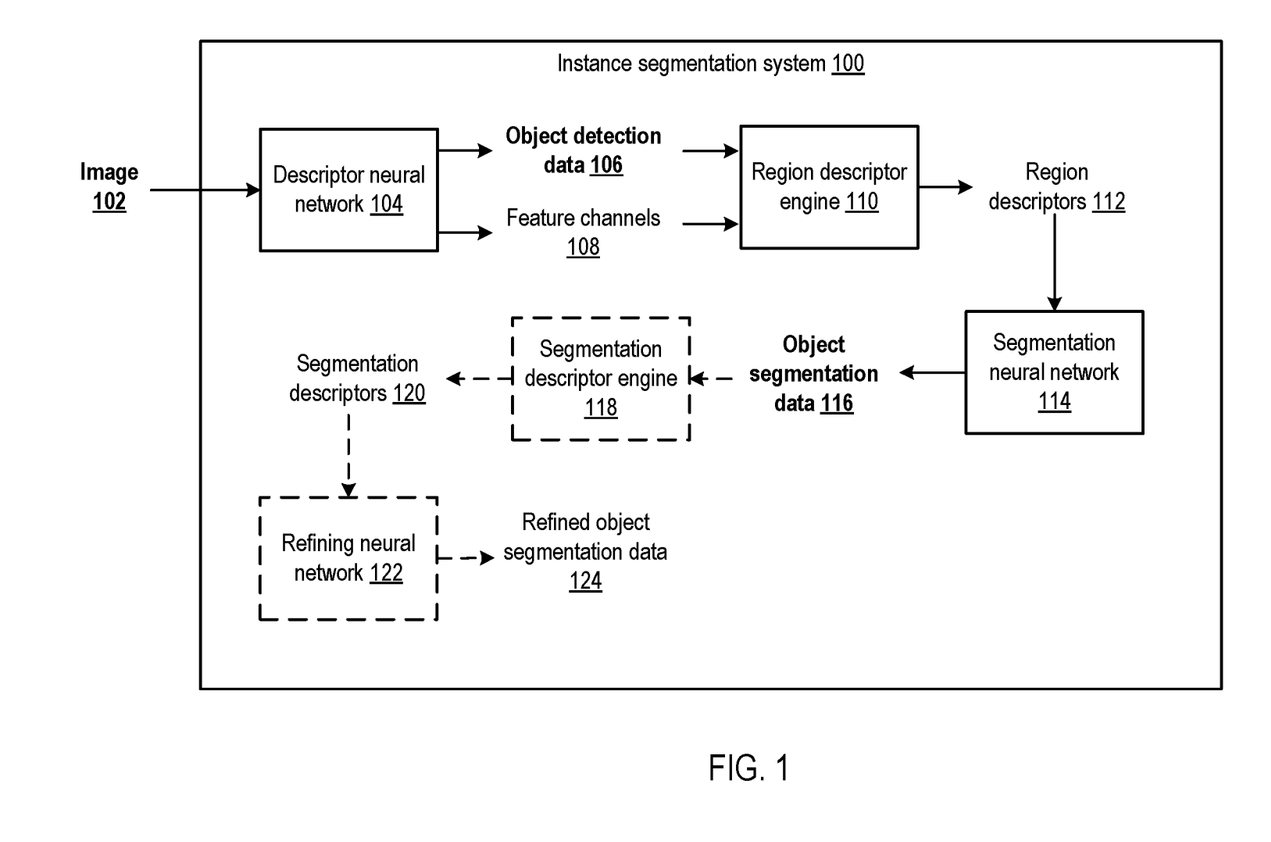
FIG. 1 is a block diagram of an example instance segmentation system.

FIG. 1 is a block diagram of an example instance segmentation system 100. The instance segmentation system 100 is an example of a system implemented as computer programs on one or more computers in one or more locations in which the systems, components, and techniques described below are implemented.

The instance segmentation system 100 is configured to process an image 102 to generate object detection data 106 and object segmentation data 116. The object detection data 106 defines: (i) regions in the image 102 that each depict a respective object instance, (ii) a respective object type of the object instance depicted in each region. The object segmentation data 116 defines a respective segmentation of the object instance depicted in each region. A segmentation of the object instance depicted in a region defines whether each pixel in the region is included in the object instance. The system 100 generates the object detection data 106 and the object segmentation data 116 using a descriptor neural network 104 and a segmentation neural network 114 that can be trained using end-to-end machine learning training techniques, as will be described in more detail below.

The image 102 can be represented as a two-dimensional (2D) array of pixels, where each pixel is represented as a vector of one or more values. For example, if the image 102 is a black-and-white image, then each pixel can be represented as an integer or floating point number (i.e., a vector with one component) representing the brightness of the pixel. As another example, if the image 102 is a red-green-blue (RGB) image, then each pixel can be represented as a vector with three integer or floating point components, which respectively represent the intensity of the red, green, and blue color of the pixel.

The system 100 processes the image 102 using the descriptor neural network 104 to generate the object detection data 106 and feature channels 108 (as will be described in more detail below). The descriptor neural network 104 is a convolutional neural network (i.e., includes one or more convolutional neural network layers), and can be implemented to embody any appropriate convolutional neural network architecture. In a particular example, the descriptor neural network 104 may include an input layer followed by a sequence of "shared" convolutional neural network layers. The output of the final shared convolutional neural network layer may be provided to a sequence of one or more additional neural network layers that are configured to generate the object detection data 106.

The additional neural network layers that are configured to generate the object detection data 106 may have an architecture derived from the object detection neural network that is described with reference to: S. Ren, K. He, R. Girshick, and J. Sun, "Faster R-CNN: towards real-time object detection with region proposal networks", Advances in Neural Information Processing Systems (NIPS), 2015 (other appropriate neural network processes may also be used, however). The output of the final shared convolutional neural network layers may be provided to a different sequence of one or more additional neural network layers to generate the feature channels 108.

The object detection data 106 can define regions in the image 102 that depict object instances by, for example, the coordinates of bounding boxes around the object instances depicted in the image 102. The object detection data 106 can define the object type of an object instance depicted in an image region by, for example, a vector of object type probabilities for the image region. The vector of object type probabilities can include a respective probability value for each of the predetermined number of possible object types. The system 100 may determine that the image region depicts an object instance of the object type which corresponds to the highest probability value in the vector of object type probabilities for the image region. Examples of object types include vehicle, cat, person, and the like, as well as a "background" object type (i.e., for pixels included in the background of an image rather than in a specific object depicted in the image).

The feature channels 108 can include: (i) semantic channels, (ii) direction channels, or (iii) both. The semantic channels and the direction channels can be represented in any appropriate format. For each pixel of the image 102, the semantic channels characterize a respective likelihood that the pixel is included in an object of each of a predetermined number of possible object types, and the direction channels characterize a direction from the pixel to the center of an object which includes the pixel. The "center" of an object can refer to, for example, the centroid of all the pixels which are included in the object. As another example, the center of an object can refer to the center of a bounding box around the object. A few example representations of semantic channels and direction channels follow.

In some implementations, the feature channels 108 may include a respective semantic channel corresponding to each object type of the predetermined number of object types. Each semantic channel can be represented as a 2D array of likelihood values (e.g., probability values between 0 and 1) which each characterize a likelihood that a corresponding pixel (or pixels) of the image 102 is included in an object of the object type corresponding to the semantic channel.

In some implementations, the feature channels 108 may include a respective direction channel corresponding to each of a predetermined number of angle ranges $$\left(\text{e.g., } \left\{[0, \frac{\pi}{2}], [\frac{\pi}{2}, \pi], [\pi, \frac{3\pi}{2}], [\frac{3\pi}{2}, 2\pi]\right\} \text{radians}\right).$$

Each direction channel can be represented as a 2D array of likelihood values (e.g., probability values between 0 and 1). Each likelihood value characterizes a likelihood that the direction from a corresponding pixel (or pixels) of the image 102 to the center of a respective object instance which includes the pixel is in the angle range corresponding to the direction channel. Likelihood values corresponding to pixels of the image which are not included in an object instance can have any appropriate value.

In some cases, the feature channels 108 may have the same dimensionality as the image 102, while in other cases, the feature channels 108 may have a different (e.g., smaller) dimensionality than the image 102. For example, the semantic channels and the direction channels included in the feature channels 108 may have a smaller dimensionality than the image 102, in which case each likelihood value in the semantic channels and direction channels may correspond to multiple pixels in the image 102.

The system 100 processes the object detection data 106 and the feature channels 108 using a region descriptor engine 110 to generate a respective region descriptor 112 for each region of the image 102 defined by the object detection data 106. The region descriptor engine 110 generates a region descriptor 112 for a region of the image 102 by extracting (e.g., cropping) feature data corresponding to the region from one or more of the feature channels 108 (i.e., one or more of the semantic channels and direction channels). The region descriptors 112 may each be represented as multi-dimensional arrays of numerical values. Generating a region descriptor for a region of the image 102 defined by the object detection data 106 is described further with reference to FIG. 3.

The system 100 processes each of the region descriptors 112 of the regions in the image 102 defined by the object detection data 106 using a segmentation neural network 114 to generate respective object segmentation data 116 for each of the regions. The object segmentation data 116 for a region defines a segmentation of the object instance depicted in the region (i.e., that has the object type specified for the region by the object detection data 106). For example, the object segmentation data 116 for a region may define a respective probability value (i.e., number between 0 and 1) that each pixel in the region is included in the object instance depicted in the region. In this example, the system 100 may determine those pixels in the region which have a probability value that satisfies (e.g., exceeds) a threshold that the pixels are included in the object instance depicted in the region.

Optionally, the system 100 can generate refined object segmentation data 124 for each region of the image 102 defined by the object detection data 106. The refined object segmentation data 124 for a region of the image 102 defines a segmentation of the object instance depicted in the region which is potentially more accurate than the segmentation of the object instance defined by the object segmentation data 116.

To generate refined object segmentation data 124 for a region of the image 102 defined by the object detection data 106, the system 100 can use a segmentation descriptor engine 118 to generate a segmentation descriptor 120 for the region. The segmentation descriptor engine 118 can generate a segmentation descriptor 120 for a region by extracting (e.g., cropping) feature data corresponding to the region from one or more intermediate outputs of the descriptor neural network 104, and concatenating the extracted feature data with the object segmentation data 116 for the region. An intermediate output of the descriptor neural network refers to outputs generated by one or more hidden layers of the descriptor neural network, for example, the shared convolutional neural network layers of the descriptor neural network (as described earlier). The system 100 can process the segmentation descriptor 120 for a region of the image 102 using a refining neural network 122 to generate the refined object segmentation data 124 for the region of the image 102.

The segmentation neural network 114 and the refining neural network 122 can be implemented to embody any appropriate neural network architecture. For example, the segmentation neural network 114 and the refining neural network 122 may be convolutional neural networks which each include one or more respective convolutional neural network layers.

The system 100 can jointly train the segmentation neural network 114 and the descriptor neural network 104 based on a set of training data which includes multiple training examples. Each training example can include: (i) a training image, (ii) target object detection data, (iii) target feature channels, and (iv) target object segmentation data. The target object detection data, the target feature channels, and the target object segmentation data represent outputs that should be generated by the system 100 by processing the training image, and can be obtained, for example, by manual human annotation.

To train the segmentation neural network 114 and the descriptor neural network 104, the system 100 processes the training images to generate object detection data 106, feature channels 108, and object segmentation data 116 for the training images. The system 100 determines gradients of a loss function (e.g., using backpropagation) which compares: (i) the object detection data 106, (ii) the feature channels 108, and (iii) the object segmentation data 116 generated by the system 100 by processing the training images to the corresponding target data included in the training examples. The system 100 can adjust the parameter values of the segmentation neural network 114 and the descriptor neural network 104 using the gradients. Over multiple training iterations, the system 100 can iteratively adjust the parameter values of the segmentation neural network 114 and the descriptor neural network 104 in the described manner until a training termination criterion is satisfied. In some cases, the system 100 can "pre-train" the descriptor neural network 114 by training the descriptor neural network 114 alone prior to jointly training the descriptor neural network 114 along with the segmentation neural network 114 and the refining neural network 122. An example process for jointly training the segmentation neural network 114, the descriptor neural network 104, and optionally, the refining neural network 122, is described with reference to FIG. 4.

In some implementations, the system 100 associates each pixel of the input image 102 with a label, where the possible labels include each of the predetermined number of object types (including the "background" type). For example, if the object segmentation data 116 defines that a given pixel of the image 102 is included in an object of a particular object type, then the system 100 may associate the pixel of the image 102 with the label of the particular object type. Associating a pixel of the image with a label may refer to, for example, storing data which links the pixel of the image with the label in a data store.

Figure 2:
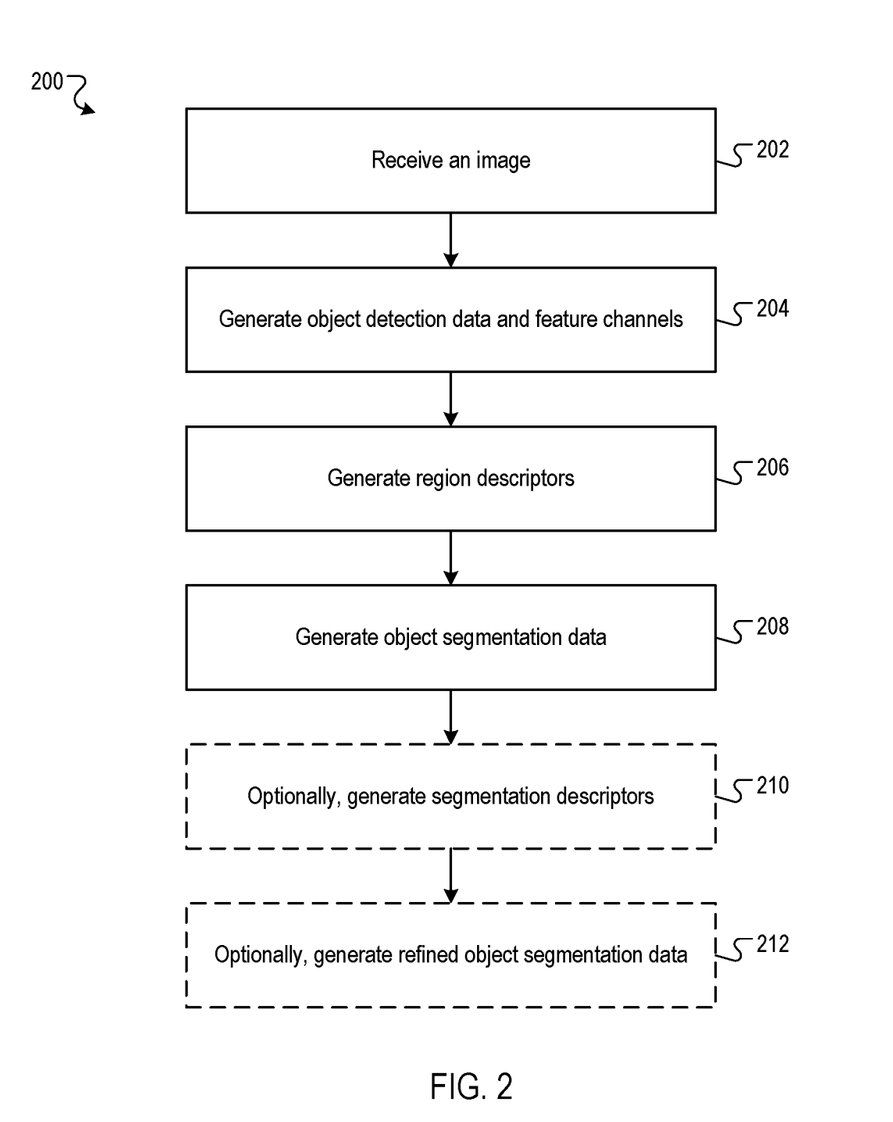
FIG. 2 is a flow diagram of an example process for processing an image to jointly perform object detection and semantic segmentation.

FIG. 2 is a flow diagram of an example process for processing an image to jointly perform object detection and semantic segmentation. For convenience, the process 200 will be described as being performed by a system of one or more computers located in one or more locations. For example, an instance segmentation system, e.g., the instance segmentation system 100 of FIG. 1, appropriately programmed in accordance with this specification, can perform the process 200.

The system receives an image (202). As described earlier, the image can be represented as a two-dimensional array of pixels, where each pixel is represented as a vector of one or more values. The image can be a black-and-white image, a color image (e.g., an RGB image), or any other kind of image.

The system processes the image using a descriptor neural network to generate object detection data and feature channels corresponding to the image (204). As described with reference to FIG. 1, the descriptor neural network can be implemented to embody any appropriate convolutional neural network architecture.

The object detection data defines: (i) regions in the image that each depict a respective object instance, and (ii) a respective object type of the object instance depicted in each region. The regions in the image that depict respective object instances can be represented, for example, by bounding boxes in the image around the respective objects. The object type of the object instance is an object type from a predetermined set of possible object types. Examples of possible object types include vehicle, cat, person, and the like (as well as a background type).

The feature channels can include: (i) semantic channels, (ii) direction channels, or (iii) both. The semantic channels and the direction channels can be represented in any appropriate format. For each pixel of the image, the semantic channels characterize a respective likelihood that the pixel is included in an object of each of a predetermined number of possible object types, and the direction channels characterize a direction from the pixel to the center of an object which includes the pixel. Examples of possible representations of the semantic channels and the direction channels are described with reference to FIG. 1.

In some cases, the system can implement a deformable cropping operation to generate data identifying the object type of an object instance depicted in a region of the image. In particular, the system can determine a partition (i.e., division) of the region of the image into multiple sub-regions, and crop portions of an intermediate output of the descriptor neural network corresponding to each of the sub-regions. The system can process the respective cropped data from the intermediate output of the descriptor neural network for each sub-region using an offset neural network to generate an off-set value for each sub-region. The off-set value for a sub-region may be represented as a pair of values representing an offset in the "x"-direction and an offset in the "y"-direction. The off-set values for the sub-regions define corresponding "off-set" sub-regions (i.e., by offsetting each sub-region by the off-set value). The system can subsequently crop and resize portions of the intermediate output of the descriptor neural network corresponding to each off-set sub-region, and process the cropped data using one or more neural network layers to generate data identifying the object type of object instance depicted in the region.

The system generates a region descriptor for each of the one or more regions defined by the object detection data (206). The system generates a region descriptor for a region of the image by extracting (e.g., cropping) feature data corresponding to the region from one or more of the feature channels 108 (i.e., one or more of the semantic channels and direction channels). The region descriptors 112 may each be represented as multi-dimensional arrays of numerical values. An example process for generating a region descriptor for a region of the image defined by the object detection data is described further with reference to FIG. 3.

For each region in the image defined by the object detection data, the system processes the region descriptor of the region using a segmentation neural network to generate respective object segmentation data for the region (208). The object segmentation data for a region defines a segmentation of the object instance depicted in the region. For example, the object segmentation data for a region may define a respective probability value (i.e., number between 0 and 1) that each pixel in the region is included in the object instance depicted in the region. In this example, the system may determine those pixels in the region which have a probability value that satisfies (e.g., exceeds) a threshold are included in the object instance depicted in the region. As described with reference to FIG. 1, the segmentation neural network can be implemented to embody any appropriate neural network architecture (e.g., a convolutional neural network architecture).

Optionally, the system generates a segmentation descriptor for each of the one or more regions defined by the object detection data (210). The system can generate a segmentation descriptor for a region by extracting (e.g., cropping) feature data corresponding to the region from one or more intermediate outputs of the descriptor neural network, and concatenating the extracted feature data with the object segmentation data for the region.

Optionally, for each region in the image defined by the object detection data, the system processes the segmentation descriptor of the region using a refining neural network to generate respective refined object segmentation data for the region (212). The refined object segmentation data for a region defines a "refined" (e.g., more accurate) segmentation of the object instance depicted in the region. For example, the refined object segmentation data for a region may define a respective probability value (i.e., number between 0 and 1) that each pixel in the region is included in the object instance depicted in the region. The refining neural network may achieve a higher object segmentation accuracy than the segmentation neural network by exploiting additional information from the intermediate outputs of the descriptor neural network.

Figure 3:
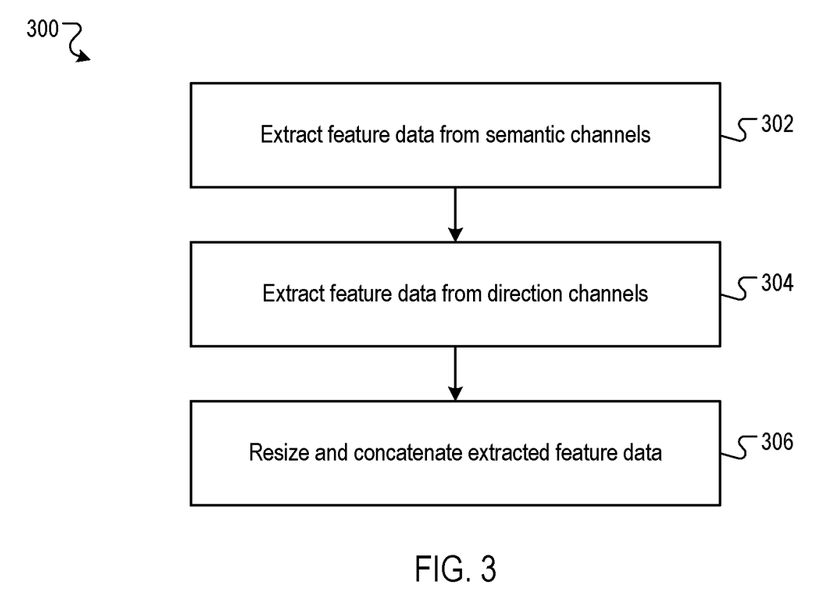
FIG. 3 is a flow diagram of an example process for generating a region descriptor for a region of the image defined by the object detection data.

FIG. 3 is a flow diagram of an example process 300 for generating a region descriptor for a region of the image defined by the object detection data. For convenience, the process 300 will be described as being performed by a system of one or more computers located in one or more locations. For example, an instance segmentation system, e.g., the instance segmentation system 100 of FIG. 1, appropriately programmed in accordance with this specification, can perform the process 300.

The system extracts (e.g., crops) feature data corresponding to the region of the image from the semantic channels (302). As described earlier, the semantic channels may include a respective semantic channel corresponding to each object type of the predetermined number of object types. The system may crop feature data from the semantic channel corresponding to the object type of the object instance depicted in the region of the image (i.e., as defined by the object detection data), while refraining from cropping feature data from the other semantic channels. In a particular example, if the object detection data defines the object type of the object instance depicted in the region as "person", the system may crop feature data corresponding to the region of the image from the semantic channel corresponding to the "person" object type.

As described earlier, each semantic channel can be represented as a 2D array of likelihood values. Each likelihood value in a semantic channel corresponds to one or more pixels of the image. For example, the 2D array of likelihood values representing a semantic channel may have the same dimensionality (i.e., same number of rows and columns) as the image, in which case each likelihood value in the semantic channel may correspond to exactly one pixel in the image. As another example, the 2D array of likelihood values representing the semantic channel may have a smaller dimensionality than the image (e.g., due to convolution operations performed in the descriptor neural network), in which case each likelihood value in the semantic channel may correspond to multiple pixels in the image. Irrespective of the dimensionality of the semantic channel relative to the image, cropping feature data corresponding to a region of the image from the semantic channel refers to extracting likelihood values from the semantic channel which correspond to the pixels included in the region of the image.

The system extracts (e.g., crops) feature data corresponding to the region of the image from the direction channels (304). For example, as described earlier, the direction channels may include a respective direction channel corresponding to each of a predetermined number of angle ranges $$\left(\text{e.g.,} \left\{[0, \frac{\pi}{2}], [\frac{\pi}{2}, \pi], [\pi, \frac{3\pi}{2}], [\frac{3\pi}{2}, 2\pi]\right\} \text{radians}\right).$$

To extract feature data corresponding to the region of the image from the direction channels, the system may define a partition of the region of the image into a predetermined set of sub-regions and associate each of the sub-regions with a different direction channel. In a particular example, the system may define a partition of a region of the image defined by a bounding box into four sub-boxes, and associate each sub-box with a direction channel corresponding to a different angle range. For each direction channel, the system may extract feature data corresponding to the sub-region of the image associated with the direction channel. The described operations to extract feature data from the direction channels may be referred to as "pooling" operations.

The system resizes the feature data extracted from the semantic channels and the direction channels to a predetermined dimensionality and concatenates the resized feature data (306). Resizing a set of data to a predetermined dimensionality refers to determining a representation of the data that has the predetermined dimensionality. For example, the system can resize the extracted feature data from a feature channel to the predetermined dimensionality using average- or max-pooling operations. In this example, the system can partition the extracted feature data from the feature channel into a grid of a predetermined number of sub-windows, and then average- or max-pool the values in each sub-window into a corresponding position in the resized representation of the extracted feature data. By resizing the extracted feature data from each feature channel to the predetermined dimensionality and concatenating the resized feature data from each feature channel, the system can generate region descriptors which have a consistent dimensionality regardless of the size and shape of the corresponding image regions. The segmentation neural network is configured to process region descriptors of the consistent dimensionality to generate the object detection data corresponding to the regions of the image.

Figure 4:
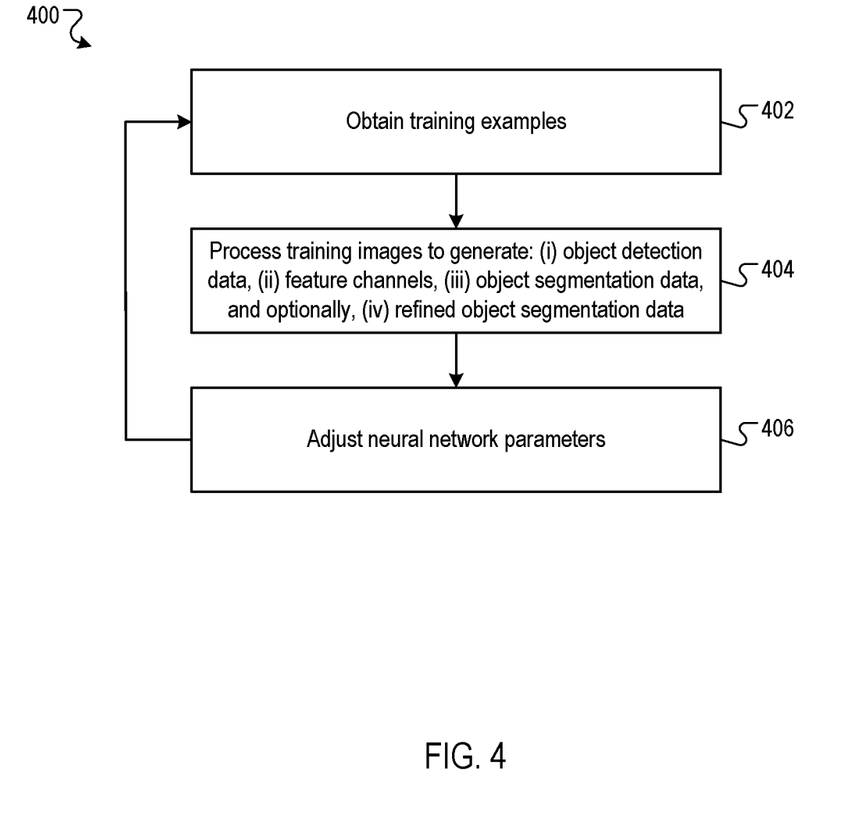
FIG. 4 is a flow diagram of an example process for jointly training the segmentation neural network, the descriptor neural network, and optionally, the refining neural network.

FIG. 4 is a flow diagram of an example process for jointly training the segmentation neural network, the descriptor neural network, and optionally, the refining neural network. For convenience, the process 400 will be described as being performed by a system of one or more computers located in one or more locations. For example, an instance segmentation system, e.g., the instance segmentation system 100 of FIG. 1, appropriately programmed in accordance with this specification, can perform the process 400.

The system obtains training examples from a set of training data which includes multiple training examples (402). Each training example can include: (i) a training image, (ii) target object detection data, (iii) target feature channels (i.e., semantic and direction channels), and (iv) target object segmentation data. The target object detection data, the target feature channels, and the target object segmentation data represent outputs that should be generated by the system by processing the training image, and can be obtained, for example, by manual human annotation. The system can obtain the training examples by randomly sampling a predetermined number of training examples from the training data.

The system processes the training images using the descriptor neural network and the segmentation neural network, in accordance with the current values of the descriptor neural network parameters and the segmentation neural network parameters, to generate respective object detection data, feature channels, and object segmentation data for the training images (404). Optionally, the system can process the object segmentation data generated for the training images using the refining neural network, in accordance with the current values of the refining neural network parameters, to generate refined object segmentation data for the training images.

The system backpropagates gradients of a loss function to adjust the parameters of the descriptor neural network, the segmentation neural network, and optionally, the refining neural network, to cause the system to generate more accurate object detection data, feature channels, object segmentation data, and optionally, refined object segmentation data (406).

The loss function may include terms which compare the object detection data generated by the system by processing the training images to the target object detection data specified by the training examples. For example, the loss function may include a smooth L1 loss term or squared-difference loss term which compares the coordinates of object instance bounding boxes defined by the object detection data and target coordinates of object instance bounding boxes defined by the target object detection data. As another example, the loss function may include a cross-entropy loss term which compares the object types defined by the object detection data and target object types defined by the target object detection data.

The loss function may include terms which compare the feature channels generated by the system by processing the training images to the target feature channels specified by the training examples. For example, the loss function may include a pixel-wise cross-entropy loss term which compares the semantic channels and the direction channels generated by the system to target semantic channels and target direction channels.

The loss function may include terms which compare the object segmentation data (and optionally, refined object segmentation data) generated by the system by processing the training images to the target object segmentation data specified by the training examples. For example, the loss function may include a pixel-wise cross-entropy loss term which compares the object segmentation data (and optionally, the refined object segmentation data) to the target object segmentation data.

The system can determine the gradient of the loss function with respect to the current parameter values of the descriptor neural network, the segmentation neural network, and optionally, the refining neural network, using any appropriate technique (e.g., backpropagation). After computing the gradient of the loss function, the training system can adjust the current parameter values of the descriptor neural network, the segmentation neural network, and optionally, the refining neural network using any appropriate gradient descent optimization algorithm update rule. Examples of gradient descent optimization algorithms include Adam, RMSprop, Adagrad, Adadelta, and AdaMax, amongst others.

After adjusting the current values of the neural network parameters based on the training examples, the system can determine if a training termination criterion is satisfied. For example, the system may determine the training termination criterion is satisfied if a predetermined number of iterations of the process 400 have been completed or if the magnitude of the gradient is below a predetermined threshold. In response to determining that the training termination criterion is met, the system can output the trained parameter values of the descriptor neural network, the segmentation neural network, and optionally, the refining neural network. In response to determining that the training termination criterion is not met, the system can return to step 402 and repeat the preceding steps.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer-implemented method comprising:
providing an image as input to a descriptor neural network that processes the image to generate outputs including: (i) data identifying one or more regions of the image, wherein an object is depicted in each region, (ii) for each region, a predicted type of object that is depicted in the region, and (iii) feature channels comprising a plurality of semantic channels and one or more direction channels, wherein:
each semantic channel is associated with a particular type of object and defines, for each pixel of the image, a respective likelihood that the pixel is included in an object of the particular type; and
the direction channels characterize a predicted direction from each pixel of the image to a center of an object depicted in the image which includes the pixel;
generating a region descriptor for each of the one or more regions, including, for each region:
for a plurality of feature channels, comprising at least one direction channel, extracting feature data corresponding to the region of the image from the feature channel;
resizing the extracted feature data to a pre-determined dimensionality; and
concatenating the resized feature data; and
providing the region descriptor for each of the one or more regions to a segmentation neural network that processes a region descriptor for a region to generate an output comprising a predicted segmentation of the predicted type of object depicted in the region.

2. The computer-implemented method of claim 1, further comprising:
generating a segmentation descriptor for each of the one or more regions, including, for each region:
extracting feature data corresponding to the region of the image from one or more intermediate outputs of the descriptor neural network;
resizing the extracted feature data from the one or more intermediate outputs of the descriptor neural network to a pre-determined dimensionality; and
concatenating the resized feature data from the one or more intermediate outputs of the descriptor neural network and the predicted segmentation of the predicted type of object depicted in the region; and
providing the segmentation descriptor for each of the one or more regions to a refining neural network, wherein the refining neural network processes a segmentation descriptor to generate a refined predicted segmentation of the predicted type of object depicted in the region.

3. The computer-implemented method of claim 1, wherein generating a region descriptor for a region comprises extracting feature data corresponding to the region of the image from the semantic feature channel associated with the predicted type of object depicted in the region.

4. The computer-implemented method of claim 1, wherein generating a region descriptor for a region further comprises pooling feature data corresponding to the region from one or more of the direction channels.

5. The computer-implemented method of claim 4, wherein pooling feature data corresponding to the region from one or more of the direction channels comprises:
partitioning the region into one or more sub-regions;
associating each of the sub-regions with a different direction channel; and
for each of the sub-regions, extracting feature data corresponding to the sub-region from the direction channel associated with the sub-region.

6. The computer-implemented method of claim 1, further comprising:
determining that a pixel of the image is included in a predicted segmentation of a predicted type of object depicted in a region; and
associating the pixel of the input image with the predicted type of object.

7. The computer-implemented method of claim 1, wherein the descriptor neural network and the segmentation neural network are jointly trained.

8. The computer-implemented method of claim 7, wherein jointly training the descriptor neural network and the segmentation neural network comprises:
backpropagating gradients of a loss function to jointly train the descriptor neural network and the segmentation neural network to generate more accurate predicted segmentations.

9. The computer-implemented method of claim 8, further comprising backpropagating gradients of the loss function to train the descriptor neural network to more accurately generate: (i) data identifying regions depicting objects, (ii) predicted types of objects depicted in the regions, and (iii) feature channels comprising semantic channels and direction channels.

10. The computer-implemented method of claim 7, further comprising backpropagating gradients of the loss function to jointly train the descriptor neural network, the segmentation neural network, and the refining neural network to generate more accurate predicted segmentations.

11. The computer-implemented method of claim 1, wherein generating a predicted type of object that is depicted in a region of the image comprises:
- dividing the region into multiple sub-regions;
- generating, using an offset neural network, an offset for each sub-region;
- extracting feature data from an intermediate output of the descriptor neural network which corresponds to each of multiple offset sub-regions;
- resizing the extracted feature data from each of the multiple offset sub-regions; and
- processing the resized feature data using one or more neural network layers of the descriptor neural network to generate a predicted type of object that is depicted in the region of the image.

12. The computer-implemented method of claim 1, wherein the descriptor neural network is pre-trained based on a set of training data.

13. One or more non-transitory computer storage media storing instructions that when executed by one or more computers cause the one or more computers to perform operations comprising:
- providing an image as input to a descriptor neural network that processes the image to generate outputs including: (i) data identifying one or more regions of the image, wherein an object is depicted in each region, (ii) for each region, a predicted type of object that is depicted in the region, and (iii) feature channels comprising a plurality of semantic channels and one or more direction channels, wherein:
  - each semantic channel is associated with a particular type of object and defines, for each pixel of the image, a respective likelihood that the pixel is included in an object of the particular type; and
  - the direction channels characterize a predicted direction from each pixel of the image to a center of an object depicted in the image which includes the pixel;
- generating a region descriptor for each of the one or more regions, including, for each region:
  - for a plurality of feature channels, comprising at least one direction channel, extracting feature data corresponding to the region of the image from the feature channel;
  - resizing the extracted feature data to a pre-determined dimensionality; and
  - concatenating the resized feature data; and
- providing the region descriptor for each of the one or more regions to a segmentation neural network that processes a region descriptor for a region to generate an output comprising a predicted segmentation of the predicted type of object depicted in the region.

14. The non-transitory computer storage media of claim 13, wherein the operations further comprise:
- generating a segmentation descriptor for each of the one or more regions, including, for each region:
  - extracting feature data corresponding to the region of the image from one or more intermediate outputs of the descriptor neural network;
  - resizing the extracted feature data from the one or more intermediate outputs of the descriptor neural network to a pre-determined dimensionality; and
  - concatenating the resized feature data from the one or more intermediate outputs of the descriptor neural network and the predicted segmentation of the predicted type of object depicted in the region; and
- providing the segmentation descriptor for each of the one or more regions to a refining neural network, wherein the refining neural network processes a segmentation descriptor to generate a refined predicted segmentation of the predicted type of object depicted in the region.

15. The non-transitory computer storage media of claim 13, wherein generating a region descriptor for a region comprises extracting feature data corresponding to the region of the image from the semantic feature channel associated with the predicted type of object depicted in the region.

16. The non-transitory computer storage media of claim 13, wherein generating a region descriptor for a region further comprises pooling feature data corresponding to the region from one or more of the direction channels.

17. The non-transitory computer storage media of claim 16, wherein pooling feature data corresponding to the region from one or more of the direction channels comprises:
- partitioning the region into one or more sub-regions;
- associating each of the sub-regions with a different direction channel; and
- for each of the sub-regions, extracting feature data corresponding to the sub-region from the direction channel associated with the sub-region.

18. The non-transitory computer storage media of claim 13, wherein the operations further comprise:
- determining that a pixel of the image is included in a predicted segmentation of a predicted type of object depicted in a region; and
- associating the pixel of the input image with the predicted type of object.

19. A system comprising:
one or more computers; and
one or more storage devices communicatively coupled to the one or more computers, wherein the one or more storage devices store instructions that, when executed by the one or more computers, cause the one or more computers to perform operations comprising:
- providing an image as input to a descriptor neural network that processes the image to generate outputs including: (i) data identifying one or more regions of the image, wherein an object is depicted in each region, (ii) for each region, a predicted type of object that is depicted in the region, and (iii) feature channels comprising a plurality of semantic channels and one or more direction channels, wherein:
  - each semantic channel is associated with a particular type of object and defines, for each pixel of the image, a respective likelihood that the pixel is included in an object of the particular type; and
  - the direction channels characterize a predicted direction from each pixel of the image to a center of an object depicted in the image which includes the pixel;
- generating a region descriptor for each of the one or more regions, including, for each region:
  - for a plurality of feature channels, comprising at least one direction channel, extracting feature data corresponding to the region of the image from the feature channel;
  - resizing the extracted feature data to a pre-determined dimensionality; and
  - concatenating the resized feature data; and
- providing the region descriptor for each of the one or more regions to a segmentation neural network that processes a region descriptor for a region to generate an output comprising a predicted segmentation of the predicted type of object depicted in the region.

20. The system of claim 19, wherein the operations further comprise:
- generating a segmentation descriptor for each of the one or more regions, including, for each region:
  - extracting feature data corresponding to the region of the image from one or more intermediate outputs of the descriptor neural network;
  - resizing the extracted feature data from the one or more intermediate outputs of the descriptor neural network to a pre-determined dimensionality; and
  - concatenating the resized feature data from the one or more intermediate outputs of the descriptor neural network and the predicted segmentation of the predicted type of object depicted in the region; and
- providing the segmentation descriptor for each of the one or more regions to a refining neural network, wherein the refining neural network processes a segmentation descriptor to generate a refined predicted segmentation of the predicted type of object depicted in the region.

\* \* \* \* \*